(12) United States Patent
Hayashi et al.

(10) Patent No.: US 10,412,033 B2
(45) Date of Patent: Sep. 10, 2019

(54) EVENT NOTIFICATION METHOD, EVENT NOTIFICATION DEVICE, AND STORAGE MEDIUM

(71) Applicant: FUJITSU LIMITED, Kawasaki-shi, Kanagawa (JP)

(72) Inventors: Narukazu Hayashi, Oosaka (JP); Kazuhiro Hayashi, Yokohama (JP); Motoaki Kojima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/017,131

(22) Filed: Feb. 5, 2016

(65) Prior Publication Data

US 2016/0255165 A1    Sep. 1, 2016

(30) Foreign Application Priority Data

Feb. 26, 2015    (JP) ................. 2015-036899

(51) Int. Cl.
*H04L 29/08*    (2006.01)
*H04L 12/58*    (2006.01)

(52) U.S. Cl.
CPC ............. *H04L 51/14* (2013.01); *H04L 51/26* (2013.01)

(58) Field of Classification Search
CPC ................. H04L 51/14; H04L 51/26
See application file for complete search history.

(56) References Cited

U.S. PATENT DOCUMENTS

| | | | | |
|---|---|---|---|---|
| 9,374,266 B1* | 6/2016 | Dellecave, Jr. | ... | H04L 29/08072 |
| 2004/0128622 A1* | 7/2004 | Mountain | .............. | G06Q 30/02 |
| | | | | 715/234 |
| 2007/0067409 A1* | 3/2007 | Eslambolchi | ....... | H04L 63/0281 |
| | | | | 709/217 |
| 2011/0307603 A1 | 12/2011 | Ishikawa | | |
| 2012/0192086 A1* | 7/2012 | Ghods | .................... | G06Q 10/10 |
| | | | | 715/753 |
| 2013/0346521 A1* | 12/2013 | Arabo | ............... | H04L 29/08693 |
| | | | | 709/206 |

FOREIGN PATENT DOCUMENTS

| | | |
|---|---|---|
| JP | 8-129536 A | 5/1996 |
| JP | 2004-272311 A | 9/2004 |
| JP | 2007-213372 | 8/2007 |
| WO | 2010/090027 | 8/2010 |

OTHER PUBLICATIONS

Japanese Office Action dated Jul. 10, 2018 for corresponding Japanese Patent Application No. 2015-036899, with English Translation, 6 pages.

* cited by examiner

*Primary Examiner* — Soe Hlaing
(74) *Attorney, Agent, or Firm* — Fujitsu Patent Center

(57) ABSTRACT

An event notification method executed by a processor included in an event notification device, the event notification method includes receiving, from a requesting source of an event, an event notification request for requesting notification of the event, the event notification request including event notification condition information including a notification condition of the event and priority information indicating a priority of notification of the event; acquiring the event from a publishing source of the event; determining whether to perform synchronous delivery of the event based on the notification condition; and notifying the requesting source of the event in an order of priority identified based on the priority information, when it is determined that synchronous delivery of the event be performed.

12 Claims, 11 Drawing Sheets

FIG. 8A

| TOPIC NAME | CALLBACK FUNCTION | PRIORITY (VALUE) | PRIORITY (METHOD) |
|---|---|---|---|
| TopicA_sync | METHOD 1 | 3 | |
| TopicB_sync | METHOD 2 | | METHOD 7 |
| TopicC_sync | METHOD 3 | | METHOD 8 |
| TopicA_sync | METHOD 4 | | METHOD 9 |
| TopicA_sync | METHOD 5 | 5 | |
| TopicB_sync | METHOD 6 | | METHOD 10 |

⇩ SELECT

FIG. 8B

| TOPIC NAME | CALLBACK FUNCTION | PRIORITY (VALUE) | PRIORITY (METHOD) |
|---|---|---|---|
| TopicA_sync | METHOD 1 | 3 | |
| TopicA_sync | METHOD 4 | 8 ⇐ | METHOD 9 |
| TopicA_sync | METHOD 5 | 5 | |

⇩ SORT

FIG. 8C

| CALLBACK FUNCTION | PRIORITY (VALUE) |
|---|---|
| METHOD 4 | 8 |
| METHOD 5 | 5 |
| METHOD 1 | 3 |

EVENT NOTIFICATION METHOD, EVENT NOTIFICATION DEVICE, AND STORAGE MEDIUM

CROSS-REFERENCE TO RELATED APPLICATION

This application is based upon and claims the benefit of priority of the prior Japanese Patent Application No. 2015-036899, filed on Feb. 26, 2015, the entire contents of which are incorporated herein by reference.

FIELD

The embodiment discussed herein is related to an event notification method, an event notification device, and a storage medium.

BACKGROUND

Systems, such as OpenAjax HUB, in which messages in a Publish/Subscribe communication model are communicated in an asynchronous manner, have been developed (for example, see Japanese Laid-open Patent Publication No. 2007-213372). Such a system allows decoupling the request side of event notification (Subscribe side: event receiving side) and the event notification side (Publish side: event publishing side), which is the side opposite to that request side, so that their respective operations are defined in applications independently of each other.

Recently, there has been an increasing shift to portals using gadgets (widgets) developed in compliance with common specifications typified by OpenSocial. Such a portal allows the user to freely combine gadgets to create content. For communication between gadgets, for example, event notification mechanisms in the Publish/Subscribe model such as OpenAjax HUB are used.

However, in a model having two phases, publishing an event and receiving the event, such as in the Publish/Subscribe model, the time at which event notification is requested (Subscribe) and the time at which, in response to this request, event notification is published (Publish) are not necessarily close in terms of time. Therefore, in some cases, the order of priority of event notification differs between the stage in which event notification is requested and the stage in which the requesting source is actually notified of the event. Consequently, if, according to the order of priority at the time at which event notification is requested, the requesting source is notified of an event after the event is published, notification of the event is sometimes performed in an order inappropriate for the time at which event notification is published although the order is appropriate for the time at which event notification is requested. In view of the above, it is desirable that event notification be performed in an appropriate order.

SUMMARY

According to an aspect of the invention, an event notification method executed by a processor included in an event notification device, the event notification method includes receiving, from a requesting source of an event, an event notification request for requesting notification of the event, the event notification request including event notification condition information including a notification condition of the event and priority information indicating a priority of notification of the event; acquiring the event from a publishing source of the event; determining whether to perform synchronous delivery of the event based on the notification condition; and notifying the requesting source of the event in an order of priority identified based on the priority information, when it is determined that synchronous delivery of the event be performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A, FIG. 8B, and FIG. 8C are diagrams depicting examples of a request information table according to the embodiment;

DESCRIPTION OF EMBODIMENT

Figure 1:
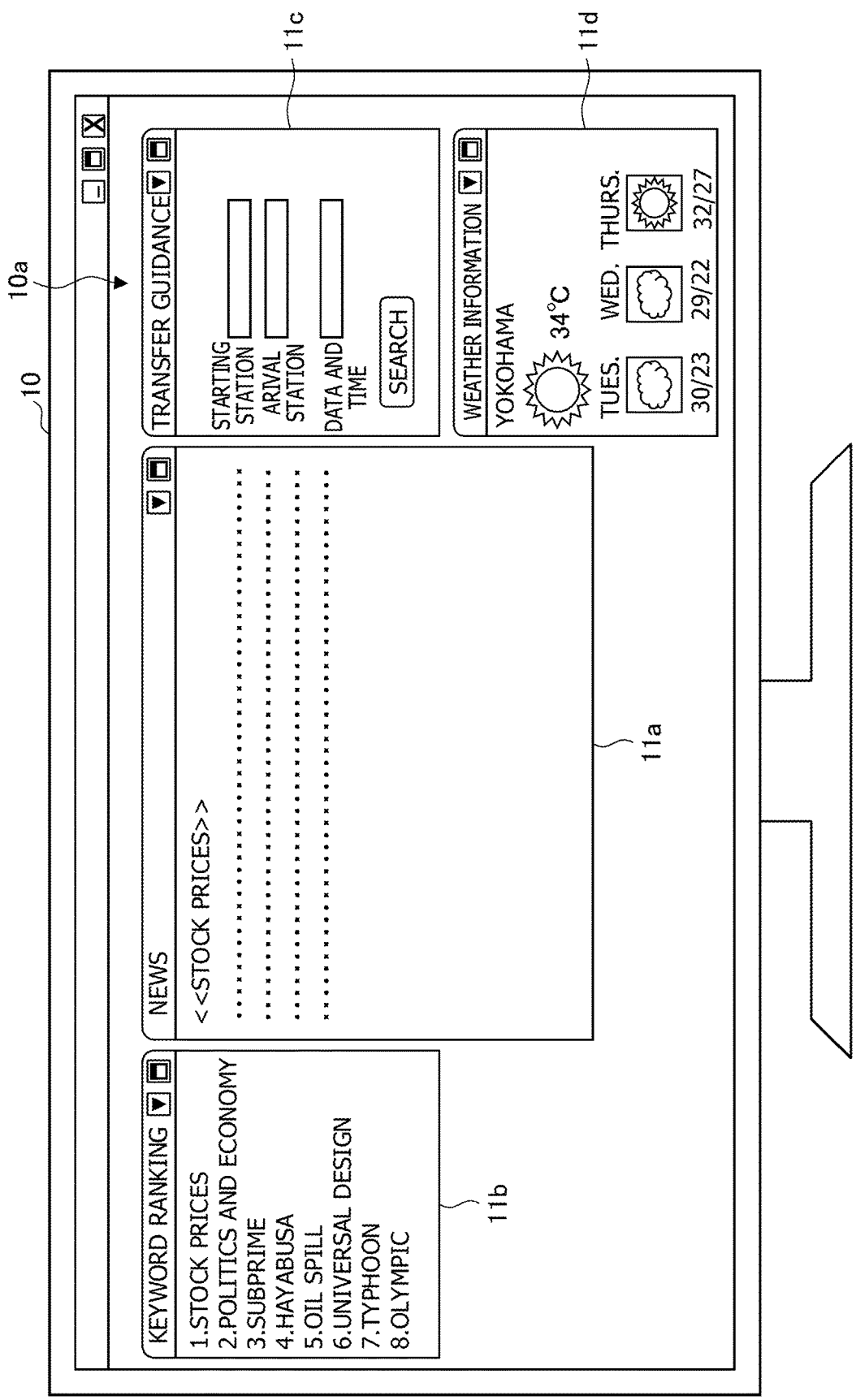
FIG. 1 is a diagram illustrating an example of screen display of gadgets.

Hereinafter, an embodiment of the present disclosure will be described with reference to the accompanying drawings. In the present specification and the drawings, components having substantially the same functional configurations are denoted by the same reference numerals and thus redundant description is omitted.

Recently, there has been an increasing shift to portals using gadgets (widgets) developed in compliance with common specifications typified by OpenSocial. A gadget is software that runs on an application (hereinafter sometimes referred to as an app) or a desktop. For example, FIG. 1 illustrates an example of gadgets arranged on a web page in a web browser. In this example, gadgets $11a$ to $11d$ that provide information on content such as news and weather on a screen $10a$ of a personal computer, which is an example of an event notification device $10$, are illustrated.

Such a portal allows the user to freely combine gadgets to create content. For communication between gadgets, for example, event notification mechanisms in the Publish/Subscribe model such as OpenAjax HUB are used.

Figure 2:
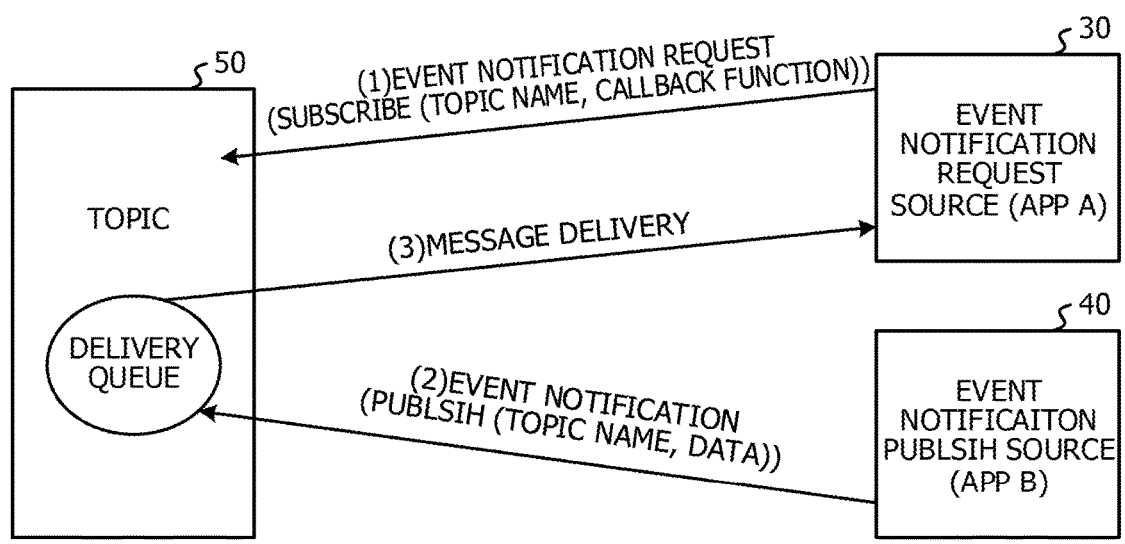
FIG. 2 is a diagram illustrating an example of a Publish/Subscribe communication model.

FIG. 2 illustrates an example of a Publish/Subscribed communication model. The gadget of an event notification requesting source 30 (the event receiving side) and the gadget of an event notification publishing source 40 (the event publishing side), which is the side opposite to the event receiving side, are decoupled, and their respective operations are defined independently of each other in applications (applications A and B in FIG. 2). The event notification requesting source 30 and the event notification publishing source 40, which are not directly aware of each other, are combined through a superordinate concept called a topic (a data interchange unit 50 described below) and perform data interchange via the topic. In such a manner, the Publish/Subscribe communication model has an advantage in that applications may be written independently of each other to allow for changes of the gadget of the event notification requesting source 30 and to allow for changes of the gadget of the event notification publishing source 40.

That is, the gadget of the event notification requesting source 30 (hereinafter sometimes referred to as a Subscribe side) neither has to be aware of what application is an application in which an event has occurred, nor has to be aware of the presence of another Subscribe processing. The Subscribe side places only the actions, that is, how the occurrence of an event acts on an object of interest, in a handler and only has to make an event notification request of (1) to the topic (the data interchange unit 50).

The gadget of the event notification publishing source 40 (hereinafter sometimes referred to as a Publish side) neither has to be aware of what application is to receive the event nor has to be aware of how the event is to be processed. The Publish side only has to provide event notification of (2) only indicating that the event has occurred, to the topic (the data interchange unit 50).

In the Publish/Subscribe communication model illustrated in FIG. 2, messages are communicated in an asynchronous manner ((3) message delivery).

Figure 3:
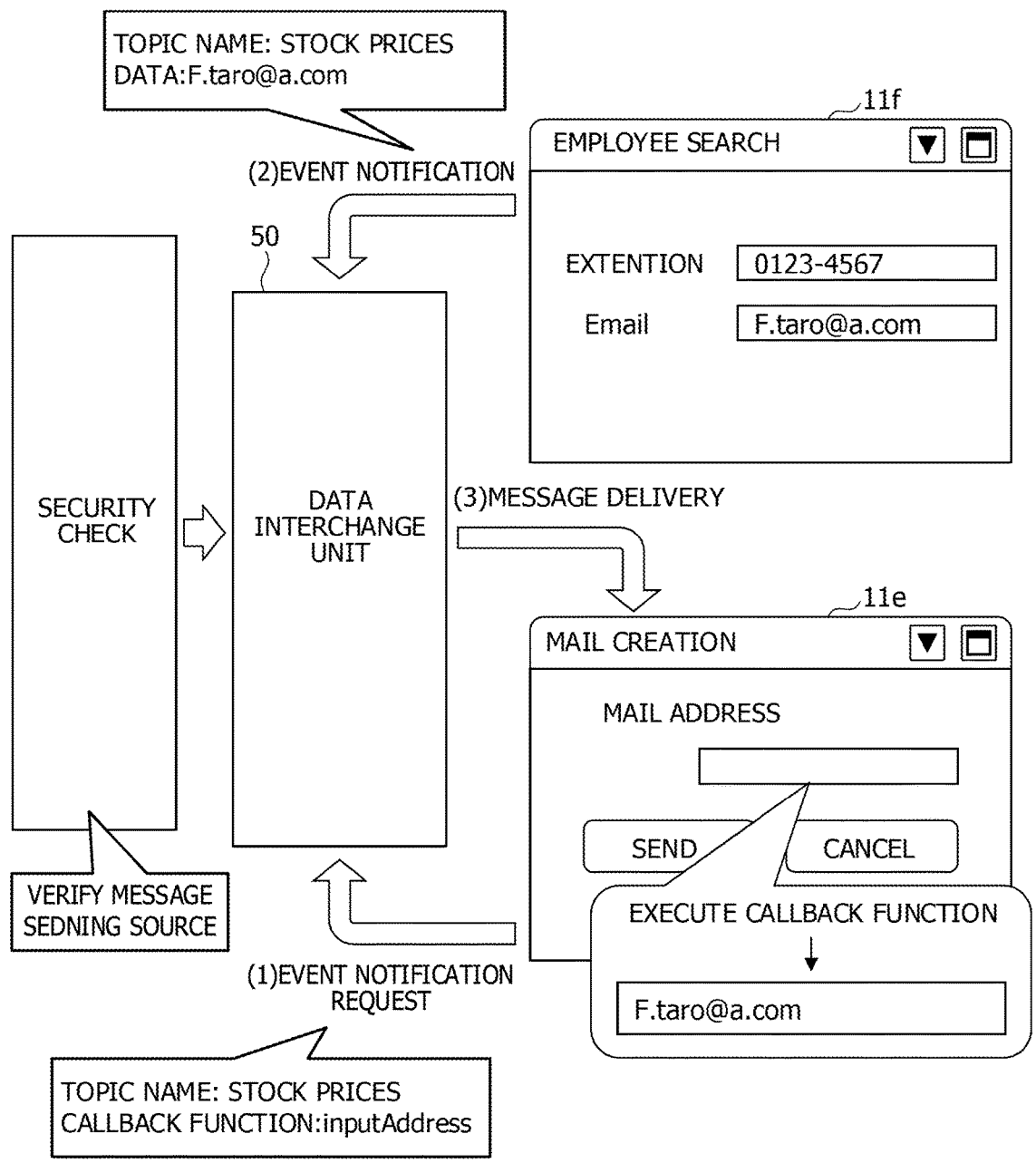
FIG. 3 is a diagram for explaining data interchange between gadgets.

For example, with reference to FIG. 3, data interchange between gadgets in the Publish/Subscribe communication model as in OpenAjax HUB will be described in detail. In the example in FIG. 3, gadgets 11e and 11f are displayed. Although the case where the gadget 11e functions as the Subscribe side and the gadget 11f as the Publish side will be described by way of example here, the gadget 11e may function as the Publish side and the gadget 11f as the Subscribe side. During initialization of a screen, Managed HUB (hereinafter sometimes referred to as the data interchange unit 50) that is responsible for data interchange between the Subscribe side and the Publish side is generated.

(1) Event Notification Request

The gadget 11e, which receives data, makes an event notification request (hereinafter sometimes referred to as Subscribe) to the data interchange unit 50 at an arbitrary time after gadget initialization ((1) event notification request). At the time of the event notification request, a Subscribe method is called with arguments "topic name" and "callback function to be invoked when data is received". The gadget 11e has to perform Subscribe before an event is published (hereinafter sometimes referred to as Publish) in the gadget 11f on the message sending side, which is subject to data interchange with the gadget 11e. Thus, if the event of a registered topic (here, stock prices) has changed, information on the changed event is delivered, via the data interchange unit 50 with that topic, from a publishing source of the event (here, the gadget 11f) to a requesting source of event notification (here, the gadget 11e).

(2) Event Publish (Notification)

The gadget 11f, which sends data attached to an event to be published, calls a Publish method with arguments "topic name" and "data (message) to be sent" ((2) event notification). Examples of the time at which Publish is performed in the gadget 11f include a time at which the ENTER key is pressed after items for completion are filled in.

(3) Message Delivery

The data interchange unit 50 specified with a topic name, verifies the gadget 11f, which is the source of sending data for which Publish has been performed (security check). If the data interchange unit 50 verifies that the gadget 11f is a gadget under management, the data interchange unit 50 sends the data to the gadget 11e that has performed Subscribe for the same topic as for Publish (here, the topic of stock prices) ((3) message delivery). The gadget 11e, upon receiving the data, processes the data using the registered callback function.

One of the techniques for securely implementing inter-gadget interchange is as follows: OpenAjax HUB 2.0 (http://www.openajax.org/member/wiki/OpenAjax_Hub_2.0_Specification). In the Publish/Subscribe communication model, since messages are communicated in an asynchronous manner, there is a problem in that the order in which messages arrive is not fixed in inter-gadget communication. In the case of an application with high independence or in the case of processing of an application that is not dependent on the processing order, no trouble occurs. However, in the case of an application that is dependent on the processing order, a trouble occurs.

For example, when there are a plurality of apps that process messages and the processing order of each app is meaningful, it is preferable that synchronous communication be used. However, if synchronous communication is used even when the processing order is meaningless, an unnecessary standby time occurs, leading to inefficiency.

(Example 1 of Application Dependent On Processing Order)

Figure 4:
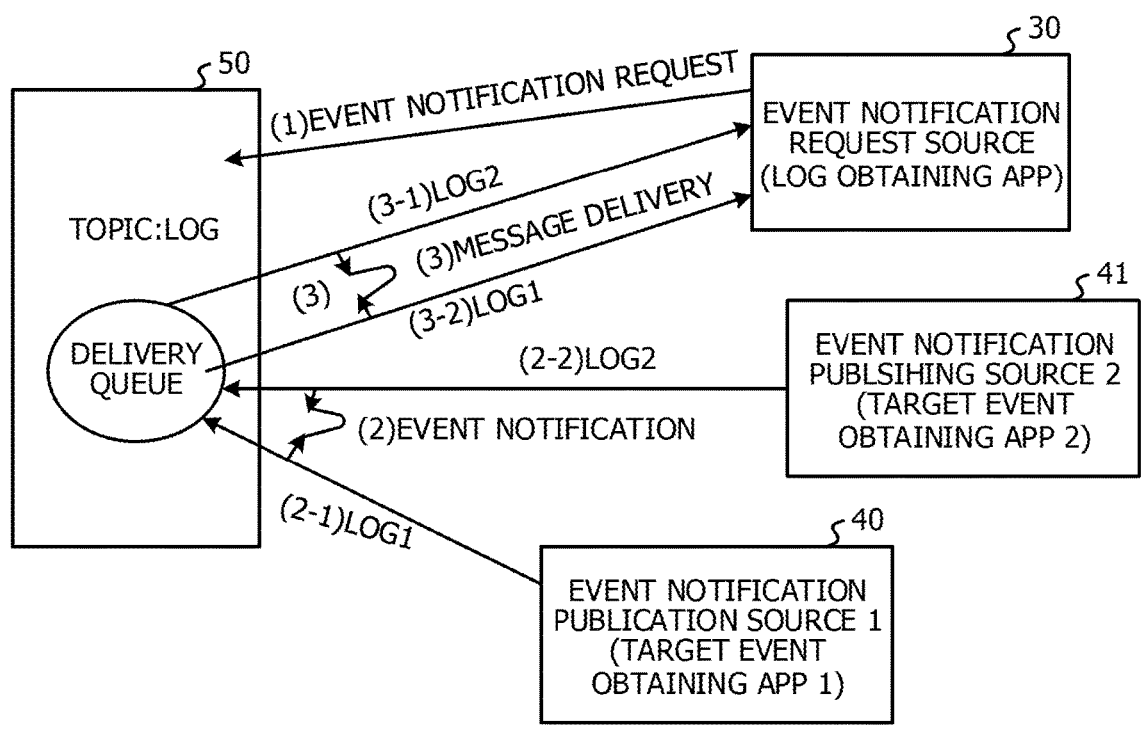
FIG. 4 is a diagram illustrating an example of problems in Publish/Subscribe communication among gadgets.

For example, FIG. 4 illustrates an example of communication in the Publish/Subscribe model when logs (traces) are to be recorded on a time-series basis for phenomena (such as method calls) that occur in a plurality of gadgets. Here, a debug log is assumed in which a large amount of events that have occurred in a plurality of gadgets are logged.

(1) First, the gadget of the event notification requesting source 30 makes a request for event notification (Subscribe) to the data interchange unit 50 with "topic: log". On the gadget of the event notification requesting source 30, a log obtaining app operates.

(2) Next, the gadgets of event notification publishing sources 40 and 41 notify the data interchange unit 50 with "topic: log" of events. Here, Publish of a log 1 generated by the operation of a target event obtaining app 1 (2-1) is first performed. Then, Publish of a log 2 generated by the operation of a target event obtaining app 2 (2-2) is performed.

(3) Next, the data interchange unit 50 with "topic: log" delivers messages to the event notification requesting source 30. Here, the log 2 is first delivered (3-1) and then the log 1 is delivered (3-2).

In such a manner, in asynchronous communication, the order in which messages have been delivered is not secured, and the order of event notification (Publish) differs from the order in which messages are delivered to the event notification requesting source (Subscribe side). In such a manner, the order in which message notification is performed from the Publish side is not fixed. On the other hand, the order in which a plurality of log events of which notification is provided are published is unknown to the gadget of the event notification requesting source 30. That is, the order in which log information is obtained does not clarify the order in which log information has occurred. Therefore, which phenomenon of the log 1 and the log 2 has occurred earlier is unknown, and it is not possible to ensure that log information is stored on a time-series basis. If log information is not stored on a time-series basis, usefulness of log information significantly decreases.

To address this, a way in which a time stamp of the time at which an event of obtaining a log has occurred is embedded in log information is conceivable. However, in such a case, a minimum analysis period of time due to the performance of a computer is given, and it is not possible to handle events of obtaining logs that have occurred at intervals less than or equal to this period of time.

A way in which sequential log numbers are obtained by using a component serving as the master and the obtained numbers are embedded in log information is conceivable. However, in such a case, two kinds of communication "communication for obtaining order numbers" and "communication for Publish" have to be used. This leads to a complicated communication procedure.

(Example 2 of Application Dependent On Processing Order)

Figure 5:
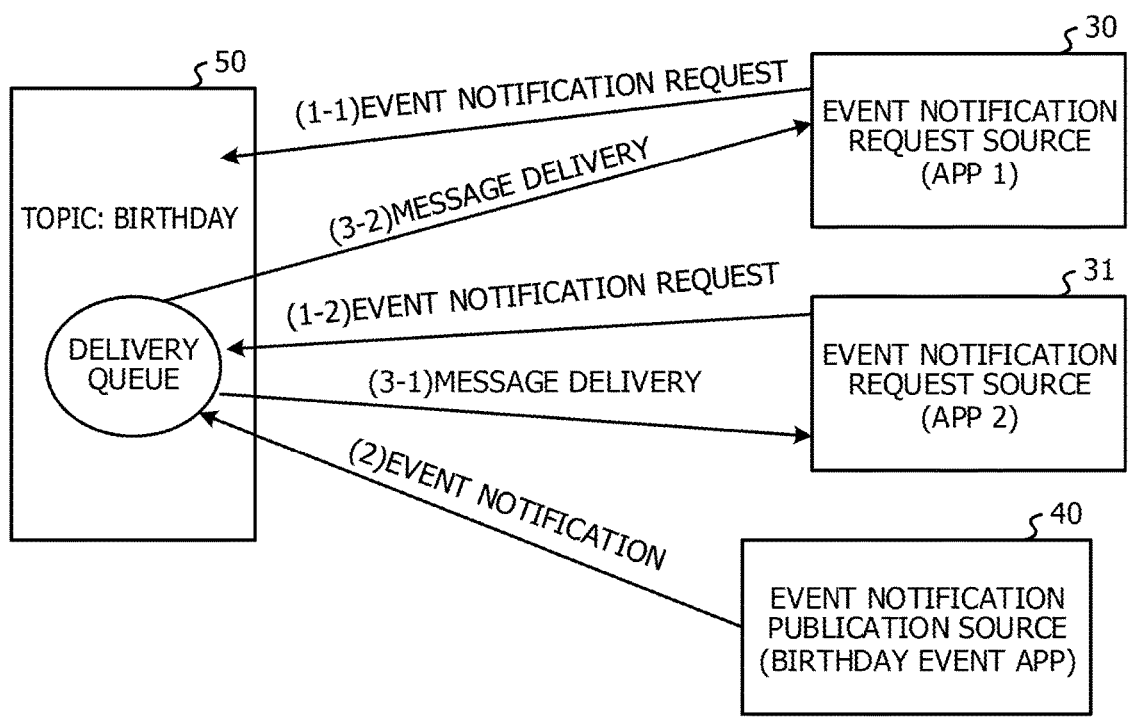
FIG. 5 is a diagram illustrating another example of the problems in the Publish/Subscribe communication among gadgets.

As illustrated in FIG. 5, when events are received for phenomena (method calls and the like) that have occurred in the gadgets of a plurality of event notification requesting sources 30 and 31, a trouble occurs in some cases.

(1-1) First, the gadget of the event notification requesting source 30 makes an event notification request (Subscribe) for "topic: birthday". The event notification publishing source 40 adds a special point for a birthday in accordance with a given age.

(1-2) Next, the gadget of the event notification requesting source 31 makes an event notification request (Subscribe) for "topic: birthday". The event notification publishing source 40 publishes a present event if a certain amount of points are present on the birthday.

(2) Next, the gadget of the event notification publishing source 40 performs event notification for "topic: birthday". Here, data on a birthday event that has occurred by the operation of a birthday event app is published.

(3) Next, the data interchange unit 50 with "topic: birthday" compares the attributes of the user who has logged in with the date of the current day and, in accordance with a result of the comparison, delivers (publishes) messages of the birthday event to the event notification requesting sources 30 and 31. Here, first, a birthday message (3-1) is delivered to the event notification requesting source 31. Then, a birthday message (3-2) is delivered to the event notification requesting source 30.

In the case where messages delivered have dependency on the order in which the gadgets have performed Subscribe (the event notification requesting source 30→the event notification requesting source 31), if messages are delivered in an order different from the order in which the gadgets have performed Subscribe as described above, the content of birthday messages changes. This causes a trouble in some cases.

For example, if event notification for the birthday is delivered to the event notification requesting source 30 earlier, a point has been already added when the event notification requesting source 30 is notified of the event for the birthday. Consequently, a present event occurs at a proper timing.

In contrast, as in the example mentioned above, when the event notification for the birthday has been delivered to the event notification requesting source 31 earlier, at that point, the point, which has to be added if the event notification for the birthday has been delivered to the event notification requesting source 30 earlier, has not yet been added. As a result, there is a possibility that a present event does not occur at a proper timing. In such a case where messages delivered have dependency on the order in which the gadgets have performed Subscribe, if it is not ensured that messages are delivered in the order in which the gadgets have performed Subscribe, a trouble occurs.

To address this, it is conceivable to provide a certain period of standby time after event notification, so that a message is not delivered to the event notification requesting source 31 until completion of delivery of a message to the event notification requesting source 30. However, in that case, a plurality of messages are not able to be concurrently delivered, and therefore there is a concern that the communication efficiency decreases to delay processing. In addition, it is not possible to uniquely determine the standby time.

(Example 3 of Application Dependent On Processing Order)

Further, in some cases, according to the situation of an application such as a situation in which a gadget that has made a request for event notification is closed at the time of Publish, although notification of an event has become unnecessary at that time of Publish, notification of that event is actually performed.

For example, in "topic: stock prices", when the stock prices have changed, notification of the current stock prices is issued as an event from the Publish side. However, the time at which event notification is requested (Subscribe) and the time at which the event notification is performed (Publish) are not necessarily close in terms of time. Consequently, there may be a case where although event notification is desired at the time of Subscribe, the notification has become unnecessary at the time at which event notification is performed (Publish). Examples of this case include a case where a gadget that is to be notified of stock prices is selected to be hidden from view before Publish or a case where the user notifies that the stock prices are temporarily to be not displayed. In such cases, even if notification of the published current values of the stock prices is performed as an event, the gadget that reflects the notification on the screen of the event notification requesting source is closed and thus the current values of the stock prices are not able to be displayed. As a result, delivery of a message to the Subscribe side becomes unnecessary.

With the problems described above taken into account, the event notification device 10 that may perform event notification in an appropriate order will be described hereinafter.

[Functional Configuration of Event Notification Device]

Figure 6:
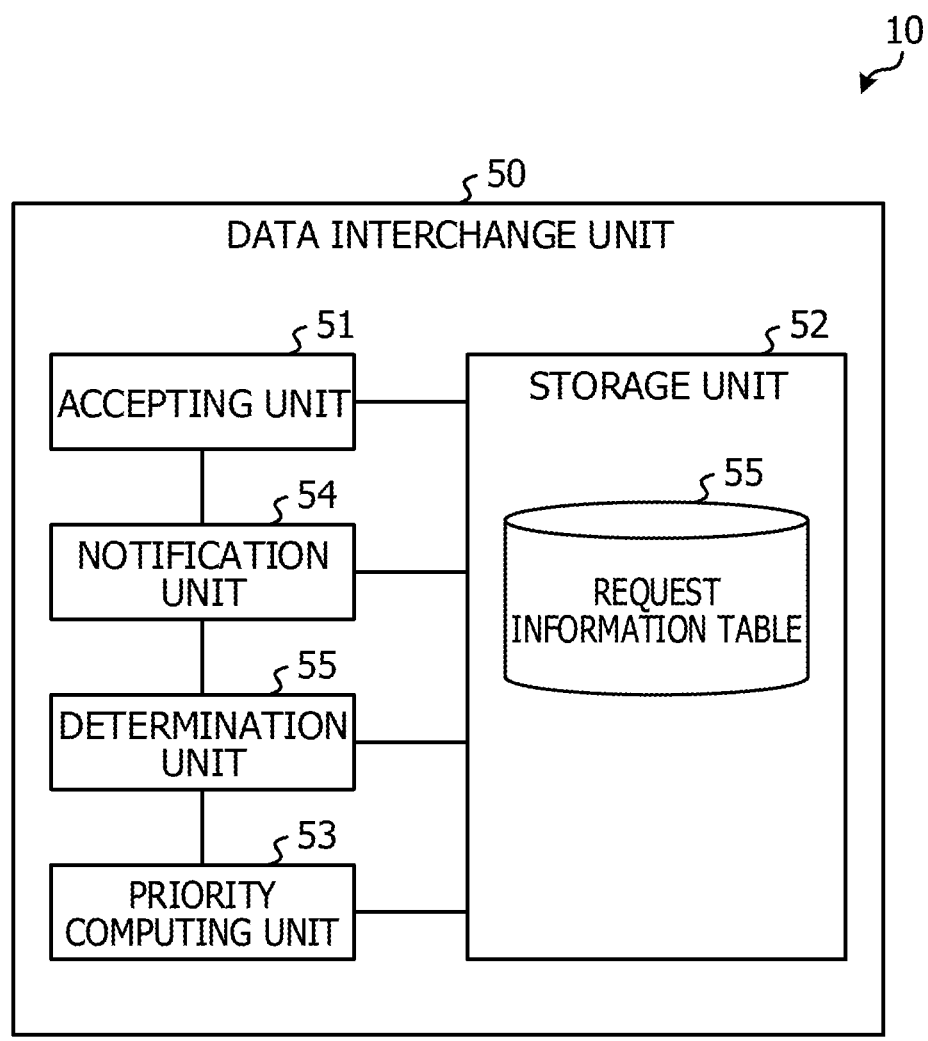
FIG. 6 is a diagram illustrating an example of a functional configuration of an event notification device according to an embodiment.
Figure 7:
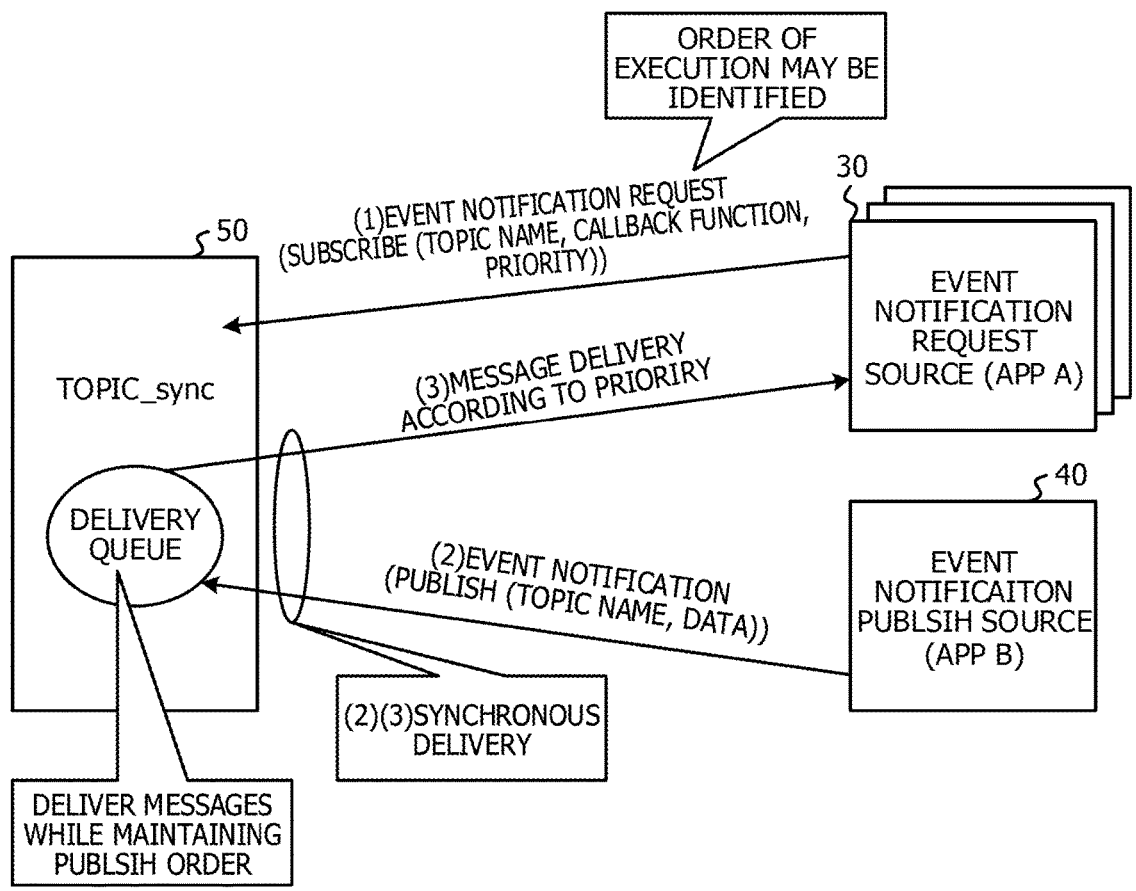
FIG. 7 is a diagram illustrating an example of Publish/Subscribe communication between gadgets according to the embodiment.

The configuration of the event notification device 10 according to an embodiment will be described with reference to FIG. 6, FIG. 7, FIG. 8A, FIG. 8B, and FIG. 8C. FIG. 6 illustrates an example of a functional configuration of the event notification device 10 according to the embodiment. FIG. 7 illustrates an example of Publish/Scribe communication between gadgets according to the embodiment. FIG. 8A, FIG. 8B, and FIG. 8C illustrate an example of a request information table according to the embodiment.

The event notification device 10 according to the present embodiment includes the data interchange unit 50. The data interchange unit 50 is generated between gadgets in Publish/Scribe communication during screen initialization.

As illustrated in FIG. 6, the data interchange unit 50 includes an accepting unit 51, a storage unit 52, a priority computing unit 53, and a notification unit 54. The accepting unit 51 accepts an event notification request including event notification condition information and priority information. For example, as illustrated in FIG. 7, one gadget, which receives data, makes an event notification request (Subscribe) to the data interchange unit 50 at an arbitrary time after initialization of the gadget. At the time of the event notification request, the gadget of the event notification requesting source 30 calls a Subscribe method with arguments "topic name", "callback function", and "priority". Thus, if the event of the registered topic changes, information on the changed event is delivered to the gadget of the event notification requesting source 30. Parameters of "topic name" and "callback function" are examples of the event notification condition information. A parameter of "priory" is an example of the priority information.

The storage unit 52 stores the event notification condition information and the priority information in a request information table 55. The request information table 55, as illustrated in FIG. 8A, includes items of a topic name 55*a*, a callback function 55*b*, a priority (value) 55*c*, and a priority (method) 55*d*.

The storage unit 52 registers, in the request information table 55, "topic name", "callback function", and "priority" specified by the gadget of the event notification requesting source 30 at the time of Subscribe. Either a value (numerical value) or a method is set for the priority and thus a parameter of "priority" is registered in either of the priority (value) 55*c* and the priority (method) 55*d* of the request information table 55.

When the priority is set with a method, the priority computing unit 53 converts a method specified with priority when notification of an event is published, into a numerical value, and computes the order of priority. In such a way, in the present embodiment, the priority may be specified with a method. This enables the priority computing unit 53 to identify the order of priority, based on dynamic conditions for priority information evaluated when notification of an event is published.

The determination unit 55 determines, based on event notification condition information, whether or not conditions for event notification through synchronous delivery in response to an event notification request are met. For example, using "topic name" included in the event notification request (that is, "topic name" specified by the gadget of the event notification requesting source 30 at the time of Subscribe), the determination unit 55 determines whether to perform synchronous delivery or asynchronous delivery of a message. If a suffix "_sync" is appended to "topic name", as in "topic name_sync", the determination unit 55 determines that synchronous delivery of a message be performed. On the other hand, if the suffix "_sync" is not appended to "topic name", the determination unit 55 determines that asynchronous delivery of a message be performed.

When event notification in accordance with "topic name" included in the event notification request has occurred and the determination unit 55 has determined that synchronous delivery of a message be performed, the determination unit 55 determines, based on event notification information, that conditions for event notification through synchronous delivery in response to the event notification request are met.

The notification unit 54 performs notification of an event according to the order of priory. When conditions for event notification in response to an event notification request are met based on event notification condition information, the notification unit 54 performs notification of the event in the order of priority identified based on dynamic conditions of priority information evaluated at the time when the conditions are met. At that point, in accordance with a result of determination of the determination unit 55, the notification unit 54 performs communication through either synchronous delivery or asynchronous delivery.

In such a way, in the present embodiment, a naming conversion of "topic name" enables switchover between logic of synchronous delivery and logic of asynchronous delivery to be performed. Thus, according to the present embodiment, an application that wants for the order of execution to be secured may switch the delivery logic to synchronous communication by specifying a topic name of synchronous communication. As a result, in the present embodiment, inter-gadget communication may be applied to both the synchronous delivery and asynchronous delivery.

For example, in cases where a suffix "_sync" is appended to a topic name at the time of Subscribe, the notification unit 54 determines that synchronous communication be performed for all the cases and performs the next processing only after return information. In that case, the notification unit 54 delivers messages from a delivery queue for event notification that has been published a plurality of times, necessarily in the order in which the published event notification has arrived.

As illustrated in FIG. 7, in the present embodiment, a parameter of "priority" is specified at the time of Subscribe. This enables the order of priority of event notification to be specified with a fixed number or a method. For example, if "priority" is specified with a numerical value, that value becomes the order of priority of event notification, just as it is. On the other hand, if "priority" is specified with a method, that method is called immediately before event notification (Publish) and the return value becomes the order of priority of the event notification.

According to the present embodiment, adding a sequential number to the priority in the gadget of an event notification requesting source in such a way enables the order of message delivery to match the order of the occurrence of events. For example, the notification unit 54 delivers messages from a delivery queue of the data interchange unit 50 in the same order as the order in which event notification is received at the time of Publish. As a result, even in the case of an application dependent on the processing order described above, it is possible to perform data interchange between gadgets without causing a trouble.

When a method is specified for "priority", the priority computing unit 53 calls the specified method at any time after an event has occurred and before a message is delivered and computes the order of priority in which messages are to be delivered. As a result, the order in which messages are delivered is able to match the order in which event notification is requested or the order in which events occur, and thus the order of notification of messages is secured in the following cases (1) and (2).

(1) The case where there are a plurality of applications on the Subscribe side for the same topic (FIG. 5).

(2) The case where a plurality of messages are published from the Publish side for the same topic (FIG. 4).

For example, in the case where there are a plurality of applications on the Subscribe side for the same topic, illustrated in FIG. 5, the topic name is changed to "topic: birthday_sync". In addition, in the gadgets of the event notification requesting sources 30 and 31, the priority specified when event notification is requested (1-2) is set to be lower than the priority specified when event notification is requested (1-1). Thus, when an event of "topic: birthday" has occurred, it is ensured that messages are delivered in the order of the event notification requesting source 30→the event notification requesting source 31. As a result, the content of a message displayed in the app 2 of (1-2) reflects a point added by the app 1 of (1-1).

When a method is specified for "priority", at any time after an event has occurred and before a message is delivered, the priority computing unit 53 calls the method and computes the order of priority, so that the following advantages (3) and (4) may be achieved.

(3) The order of delivery of messages may be selected in accordance with the situation at the time of Publish.

(4) Unnecessary message delivery may be omitted.

In particular, regarding the advantage of (4), even when notification of a change in event is delivered, the change in event is not able to be reflected, for example, in the case where a gadget on the screen is closed, and delivery of a message becomes unnecessary as described above. In order to omit such unnecessary communication, the priority computing unit 53 calls a specified method for priority at any time after an event has occurred, such as the time of Publish, and before a message is delivered. Then, based on event notification condition information set at the time of Subscribe, the priority computing unit 53 determines whether or not conditions of event notification for an event notification request are met. If it is determined that the conditions of event notification are not met at the time of Publish, the priority computing unit 53 sets the priority to a negative value. Thus, in the present embodiment, the notification unit 54 may cause a message to be not delivered, by setting a condition that if the priority is a negative value, an update method does not have to be called.

Although, in the present embodiment, the condition that if the priority is set to a negative value, an update method does not have to be called is set, the condition is not limited to this. That is, the notification unit 54 may cause a message to be not delivered without performing a process of calling an update method if the priority has a value less than or equal to a given value or is included in a predetermined value or range.

For example, the gadget of the event notification requesting source 30 sets Subscribe (topic: stock prices_sync, a method of updating a stock prices column, a method of returning a negative value if the stock prices column is absent) in (1-1) of FIG. 5 and thus may obtain the effects of (3) and (4) described above.

[Event Notification Request Process]

Figure 9:
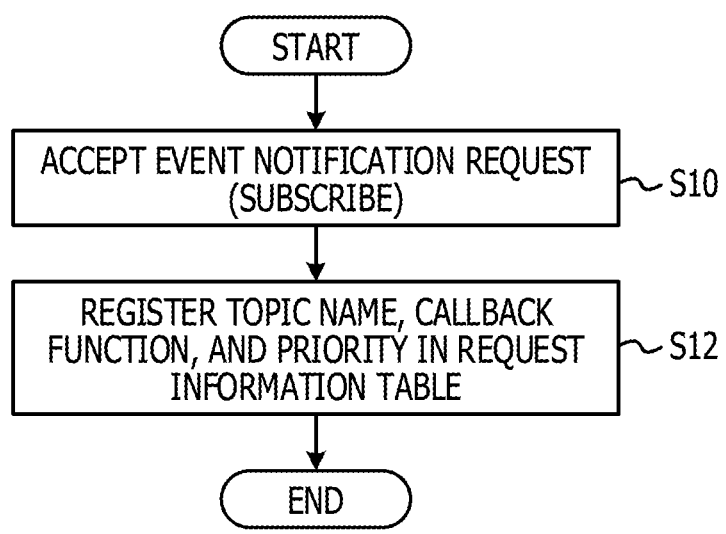
FIG. 9 is a flowchart illustrating an example of an event notification request process according to the embodiment.

Next, an event notification request process according to the present embodiment will be described with reference to FIG. 9. FIG. 9 is a flowchart illustrating an example of the event notification request process according to the present embodiment. This process is requested from an application of the gadget of the event notification requesting source (Subscribe side).

Once this process starts, the accepting unit 51 accepts an event notification request (Subscribe) (step S10). As illustrated in FIG. 7, parameters of "topic name", "callback function", and "priority" are specified in the event notification request. The storage unit 52 registers, in the request information table 55, "topic name" "callback function", and "priority" specified by the gadget of the event notification requesting source at the time of Subscribe (step S12) and completes this process.

Thus, as depicted in FIG. 8A, each time a request for event notification is accepted, a topic name and so on are saved in the request information table 55.

[Event Notification Process]

Figure 10:
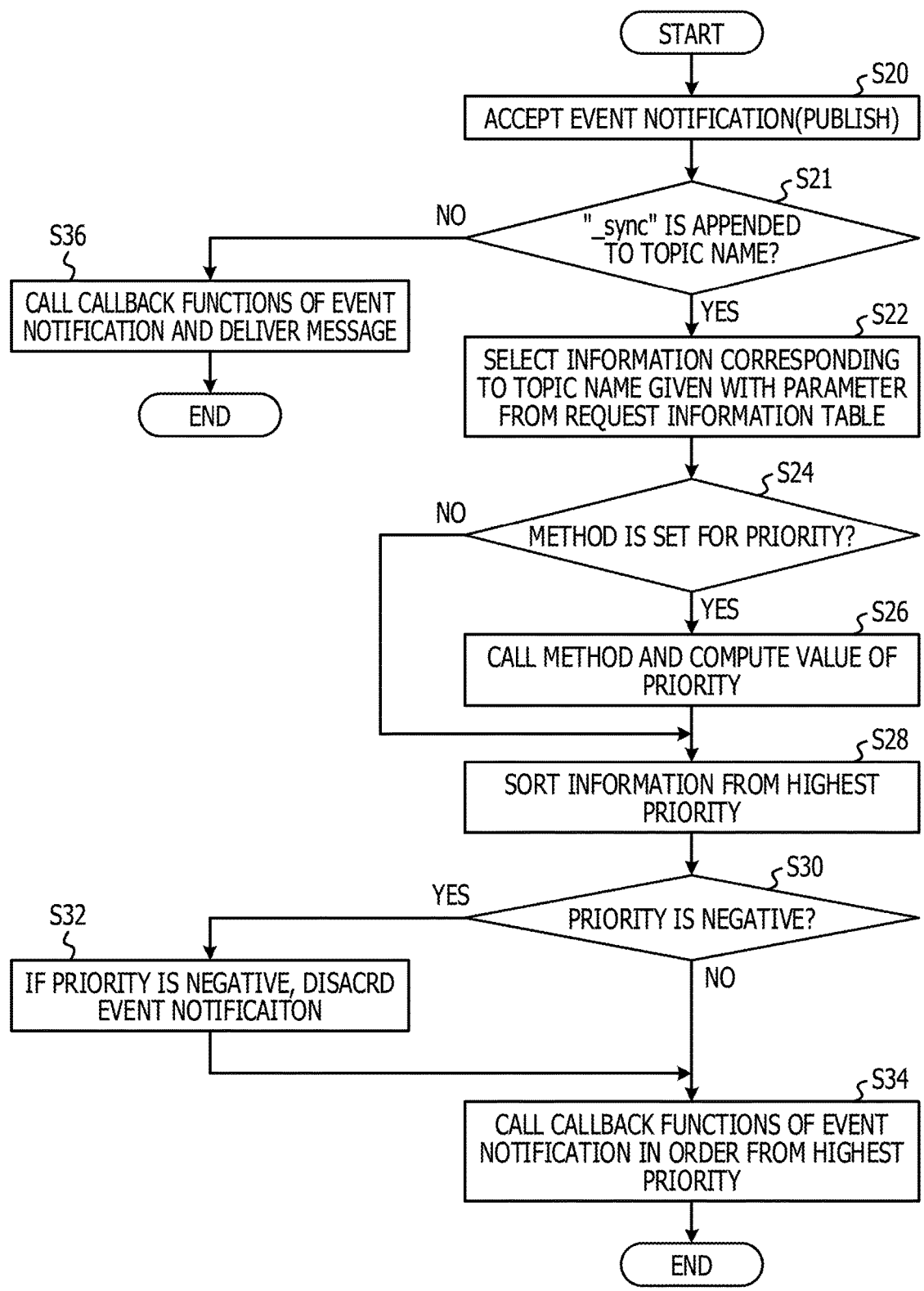
FIG. 10 is a flowchart illustrating an example of the event notification request process according to the embodiment.

Next, an event notification process according to the present embodiment will be described with reference to FIG. 10. FIG. 10 is a flowchart illustrating an example of the event notification process according to the present embodiment. This process is notified from an application of the gadget of the publishing source of event notification (Publish side).

Once this process starts, the accepting unit 51 accepts notification of an event (Publish) (step A20). As illustrated in FIG. 7, parameters of "topic name" and "data" are specified in notification of an event.

The determination unit 55 determines whether or not a suffix "_sync" is appended to "topic name" (step S21). If the determination unit 55 determines that the suffix "_sync" is not appended to "topic name", the determination unit 55 determines that asynchronous delivery of a message be performed. In this case, the notification unit 54 calls a callback function of event notification, delivers a message (step S36) and completes this process.

On the other hand, if, in step S21, the determination unit 55 determines that the suffix "_sync" is appended to "topic name", the determination unit 55 determines that synchronous delivery of a message be performed, and proceeds to step S22.

The priority computing unit 53 selects, from the request information table 55, information corresponding to a topic name given by a parameter of notification of the event (step S22). For example, when, in notification of an event, "Topic A" is specified for "topic name", information corresponding to "Topic A" is selected from the request information table 55, as illustrated in FIG. 8B.

Next, the priority computing unit 53 determines whether or not a method is set for priority (step S24). If it is determined that a method is set for priority, the priority computing unit 53 calls the set method and computes the value of priority based on the method (step S26). In the second row in FIG. 8B, the priority (method) 55d is set to "method 9". In this case, the priority computing unit 53 computes the value of priority based on the method 9. As a result, the priority (value) 55c in the second row in FIG. 8B is set to "8". If the priority computing unit 53 determines that a method is not set for priority, the priority computing unit 53 proceeds to step S28.

Next, the notification unit 54 sorts information in order from the highest priority (step S28). A result obtained by sorting information in FIG. 8B in order from the highest priority is depicted in FIG. 8C.

Next, the notification unit 54 determines whether or not there is a priority with a negative value (step S30). If the notification unit 54 determines that there is a priority with a negative value, the notification unit 54 discards event notification with a priority having a negative value (step S32).

For event notification other than the discarded event notification, the notification unit 54 calls a callback function of each event notification in order from the highest priority. The notification unit 54 then delivers messages from the highest priority (step S34) and completes this process. Thus, as depicted in FIG. 8C, callback functions of "method 4", "method 5", and "method 1" are called in order from the highest value in the priority (value) 55c. Then, messages are delivered to the gadgets of event notification requesting sources specified with the methods in order from the highest priority.

As described above, with the event notification device 10 according to the present embodiment, it is possible to provide inter-gadget communication in which an application using asynchronous communication is compatible with an application for which the message arrival order has to be secured using synchronous communication.

In the case of Publish/Subscribe using synchronous communication, setting "priority" for an event notification request at the time of Subscribe makes it possible to establish the order in which messages of event notification are delivered. In addition, setting "priority" to a negative value makes it possible to reduce unnecessary message delivery that is unnecessary at the time of Publish.

For example, the case in which, when, as certain data (topic A) is updated, gadgets 11*b*, 11*c*, and 11*d* on the screen 10*a* in FIG. 1 are updated, it is desired to update data in the order from left to right and from top to bottom on the screen 10*a* will be described. In this case, it is desired to redraw gadgets in the order of the gadget 11*b* of "keyword ranking", the gadget 11*c* of "transfer guidance", and the gadget 11*d* of "weather information" upon update of data. At this point, according to the present embodiment, (1) the accepting unit 51, when accepting a request for event notification from a requesting source of event notification, accepts a method at the time of event occurrence and a method for priority;

(2) at this point, the priority obtained with a specified method is not uniquely determined when event notification is requested, and thus a method in which the priority is computed from the position of display of a gadget of interest is specified;

(3) the priority computing unit 53 calls the method for priority when event notification of the specified topic is published and computes the priority from the display position of the gadget of the requesting source; and (4) the notification unit 54 notifies events in order from the highest priority.

Thus, in order from the highest priority, in the order of the gadget 11*b* of "keyword ranking", the gadget 11*c* of "transfer guidance", and the gadget 11*d* of "weather information", data is updated.

(Hardware Configuration Example)

Figure 11:
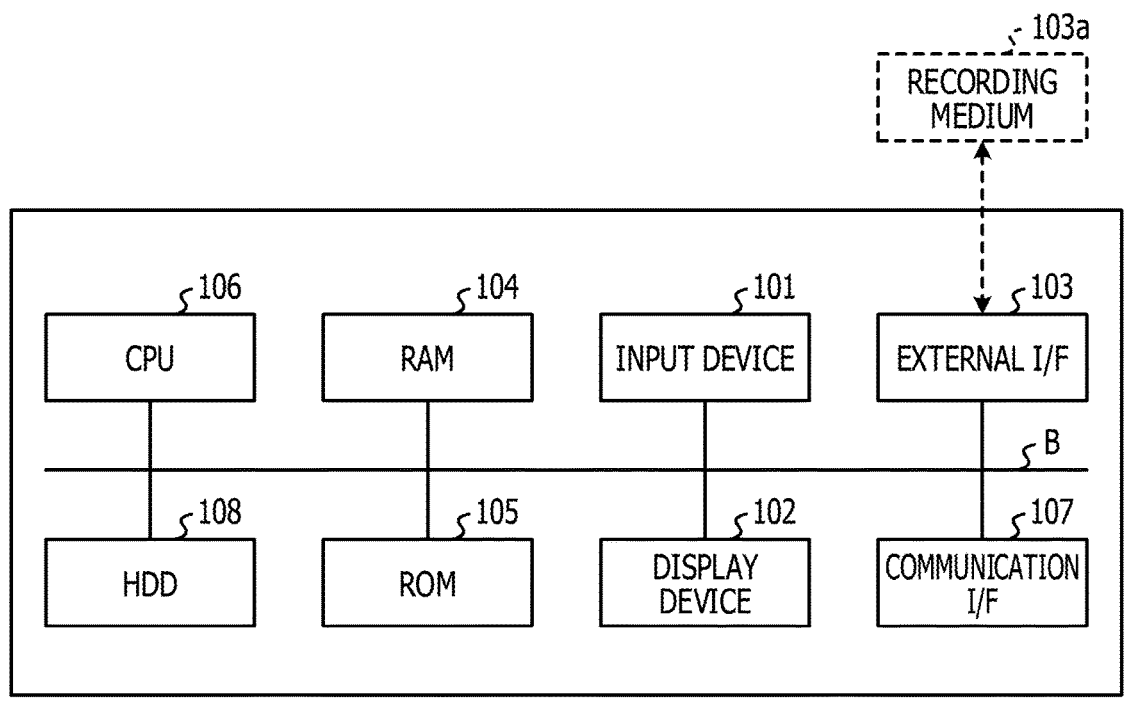
FIG. 11 is a diagram illustrating an example of a hardware configuration of the event notification device according to the embodiment.

Finally, a hardware configuration example of the event notification device 10 according to the present embodiment will be described with reference to FIG. 11. The event notification device 10 includes an input device 101, a display device 102, an external interface (I/F) 103, a random access memory (RAM) 104, a read only memory (ROM) 105, a central processing unit (CPU) 106, a communication I/F 107, and a hard disk drive (HDD) 108. Each component is mutually coupled via a bus B.

The input device 101, which includes a keyboard, a mouse, and the like, is used for inputting each operation signal to the event notification device 10. The display device 102, which includes a display 10*a*, displays updated data of various gadgets.

The communication I/F 107 is an interface coupling the event notification device 10 to a network. Thus, the event notification device 10 may perform data communication with another device via the communication I/F 107.

The HDD 108 is a nonvolatile storage device storing programs and data. The programs and data to be stored include basic software, which controls the entire device, and application software. For example, in the HDD 108, various kinds of database (DB) information, programs, and so on are stored.

The external I/F 103 is an interface with an external device. Examples of the external device include a recording medium 103*a*. Thus, the event notification device 10 may perform reading from and/or writing to the recording medium 103*a* via the external I/F 103. Examples of the recording medium 103*a* include a compact disk (CD) and a digital versatile disk (DVD), and a secure digital (SD) memory card and a universal serial bus (USB) memory.

The ROM 105 is a nonvolatile semiconductor memory (storage device) capable of retaining internal data even when powered off. Programs and data for network setting and the like are stored in the ROM 105. The RAM 104 is a volatile semiconductor memory (storage device) that temporarily stores programs and data. The CPU 106 is a computing device that reads programs and data from the above storage device (for example, "the HDD 108", "the ROM 105", or the like) to the RAM 104 and executes processes so as to implement control of the entire device and loading functions.

With the hardware configuration described above, the event notification device 10 according to the present embodiment may perform the event notification request process and the event notification process. For example, the CPU 106 executes the event notification request process and the event notification process using data and programs stored in the ROM 105 and the HDD 108. As a result, in the present embodiment, it is possible to perform Publish and Subscribe for event notification. The request information table 55 may be stored in the RAM 104, the HDD 108, a server on a cloud coupled via a network to the event notification device 10, or the like.

As described above, an event notification program, an event notification method, and an event notification device have been described through the above embodiment. However, the event notification program, the event notification method, and the event notification device according to the present disclosure are not limited to the above embodiment and may be modified and improved in various ways within the scope of the present disclosure. A plurality of matters described in the above embodiment may be combined to the extent not inconsistent herewith. Each function of the event notification device may be configured by hardware, may be configured by software, or may be configured in a combination of hardware and software.

For example, the configuration of the event notification device according to the embodiment described above is exemplary and does not limit the scope of the present disclosure. It is to be understood that there are various system configuration examples in accordance with applications and objects.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An event notification method executed by a processor included in an event notification device provided with a display device, the event notification method comprising:

receiving a plurality of notification requests for requesting notification of an event, each of the plurality of notification requests including event notification condition information that includes a topic name related to the event, a callback function for acquiring the event, and priority information that includes a priority of notification of the event;

storing the plurality of notification requests into request information;

when a notification of the event is received, determining whether to perform synchronous delivery of the event based on a naming conversion of a topic name included in the notification of the event;

selecting one or more notification requests corresponding to the notification of the event from the request information when it is determined that the synchronous delivery of the event is to be performed, each of the selected one or more notification requests having a delivery destination of the synchronous delivery;

for the each of the selected one or more notification requests:
  determining whether a method is set in the priority information;
  converting the method into a numerical value when it is determined that the method is set in the priority information; and
  setting an order of notification of the event based on the numerical value converted from the method set in the priority information;

notifying a plurality of requesting sources of the event by using the callback function included in the each of the selected plurality of notification requests, in accordance with the order of notification set for the each of the selected plurality of notification requests; and displaying the notified event corresponding to each of the plurality of requesting sources on a screen of the display device in response to an instruction by each of the plurality of requesting sources.

2. The event notification method according to claim 1, further comprising:
  determining whether the priority information includes a value indicating that the event be discarded; and
  discarding the event when it is determined that the priority information includes the value indicating that the event be discarded.

3. The event notification method according to claim 2, wherein the value indicating that the event be discarded is a negative value.

4. The event notification method according to claim 2, wherein the value indicating that the event be discarded is a value less than or equal to a given value.

5. The event notification method according to claim 1, further comprising
  executing a security check for a publishing source when the event is obtained from the publishing source,
  wherein the notifying includes notifying a requesting source of the event when it is determined that the publishing source is under management of the event notification device, through the security check.

6. The event notification method according to claim 1, wherein the event notification condition information further includes a callback function for calling a Subscribe method.

7. The event notification method according to claim 1, wherein the determining includes determining whether to perform the synchronous delivery of the event in accordance with a naming conventions of a suffix of the topic name.

8. The event notification method according to claim 1, wherein the determining includes:
  determining that synchronous delivery of the event is to be performed when a suffix indicating synchronous delivery is included in information on a topic name included in the notification condition; and
  determining that asynchronous delivery of the event is not to be performed when the suffix is not included in the information on the topic name.

9. The event notification method according to claim 8, wherein the notifying includes:
  performing notification of a plurality of events including event published from a publishing source to respective requesting sources according to an order in which the plurality of events arrive, when it is determined that synchronous delivery of the event is to be performed.

10. The event notification method according to claim 9, further comprising:
  setting a condition that if the priority in the priority information is a negative value, an update method does not have to be called, and
  when determining that asynchronous delivery of the event is not to be performed, setting the priority to the negative value.

11. An event notification device, comprising:
a memory; and
a processor coupled to the memory and configured to:
  receive a plurality of notification requests for requesting notification of an event, each of the plurality of notification requests including event notification condition information that includes a topic name related to the event, a callback function for acquiring the event, and priority information that includes a priority of notification of the event,
  store the plurality of notification requests into request information,
  when a notification of the event is received, determine whether to perform synchronous delivery of the event based on a naming conversion of the topic name included in the notification of the event,
  select one or more notification requests corresponding to the notification of the event from the request information when it is determined that the synchronous delivery of the event is to be performed, each of the selected one or more notification requests having a delivery destination of the synchronous delivery,
  for the each of the selected one or more notification requests:
    determine whether a method is set in the priority information,
    convert the method into a numerical value when it is determined that the method is set in the priority information, and
    set an order of notification of the event based on the numerical value converted from the method set in the priority information,
  notify a plurality of requesting sources of the event by using the callback function included in the each of the selected plurality of notification requests, in accordance with the order of notification set for the each of the selected plurality of notification requests, and display the notified event corresponding to each of the plurality of requesting sources on a screen of the display device in response to an instruction by each of the plurality of requesting sources.

12. A non-transitory computer-readable storage medium storing a program that causes one or more processors included in a computer to execute a process, the process comprising:

receiving a plurality of notification requests for requesting notification of an event, each of the plurality of notification requests including event notification condition information that includes a topic name related to the event, a callback function for acquiring the event, and priority information that includes a priority of notification of the event;

storing the plurality of notification requests into request information;

when a notification of the event is received, determining whether to perform synchronous delivery of the event based on a naming conversion of a topic name included in the notification of the event;

selecting one or more notification requests corresponding to the notification of the event from the request information when it is determined that the synchronous delivery of the event is to be performed, each of the selected one or more notification requests having a delivery destination of the synchronous delivery;

for the each of the selected one or more notification requests:

determining whether a method is set in the priority information;

converting the method into a numerical value when it is determined that the method is set in the priority information; and setting an order of notification of the event based on the numerical value converted from the method set in the priority information;

notifying a plurality of requesting sources of the event by using the callback function included in the each of the selected plurality of notification requests, in accordance with the order of notification set for the each of the selected plurality of notification requests; and displaying the notified event corresponding to each of the plurality of requesting sources on a screen of the display device in response to an instruction by each of the plurality of requesting sources.

* * * * *